(12) United States Patent
Bruno et al.

(10) Patent No.: US 11,047,237 B2
(45) Date of Patent: Jun. 29, 2021

(54) MIXING RAM AND BLEED AIR IN A DUAL ENTRY TURBINE SYSTEM

(71) Applicant: Hamilton Sundstrand Corporation, Charlotte, NC (US)

(72) Inventors: Louis J. Bruno, Ellington, CT (US); Harold W. Hipsky, Willington, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 93 days.

(21) Appl. No.: 15/604,440

(22) Filed: May 24, 2017

(65) Prior Publication Data

US 2017/0342838 A1 Nov. 30, 2017

Related U.S. Application Data

(60) Provisional application No. 62/341,845, filed on May 26, 2016.

(51) Int. Cl.
| | | |
|---|---|---|
| *F01D 1/02* | (2006.01) | |
| *F01D 5/02* | (2006.01) | |
| *F04D 17/02* | (2006.01) | |
| *F04D 27/00* | (2006.01) | |
| *F04D 29/58* | (2006.01) | |

(Continued)

(52) U.S. Cl.
CPC ............ *F01D 1/023* (2013.01); *B64D 13/06* (2013.01); *F01D 5/02* (2013.01); *F02C 6/08* (2013.01); *F04D 17/025* (2013.01); *F04D 27/002* (2013.01); *F04D 29/441* (2013.01); *F04D 29/541* (2013.01); *F04D 29/5826* (2013.01); *B64D 2013/0618* (2013.01);

(Continued)

(58) Field of Classification Search
CPC .......... F01D 1/023; F01D 5/02; B64D 13/06; B64D 2013/0618; F02C 6/08; F04D 29/5826; F04D 27/002; F04D 17/025; F04D 29/541; F04D 29/441; Y02T 50/56; Y02T 50/676; F05D 2260/213; F05D 2260/606

See application file for complete search history.

(56) References Cited

U.S. PATENT DOCUMENTS

| | | |
|---|---|---|
| 2,800,002 A | 7/1957 | Seed |
| 3,177,676 A | 4/1965 | Abrahams |

(Continued)

FOREIGN PATENT DOCUMENTS

| | | |
|---|---|---|
| CA | 2968745 A1 | 11/2017 |
| EP | 1112930 A2 | 7/2001 |

(Continued)

OTHER PUBLICATIONS

Extended Search Report dated Jun. 7, 2018 in European Patent Application No. 17204787.

(Continued)

*Primary Examiner* — Joseph J Dallo
*Assistant Examiner* — Kurt Philip Liethen
(74) *Attorney, Agent, or Firm* — Cantor Colburn LLP

(57) ABSTRACT

A system is provided. The system includes a first medium at a first pressure, a second medium at a second pressure, and a medium conditioning sub-system. The medium conditioning sub-system includes a compressor, a first heat exchanger, a second heat exchanger, and a turbine. The turbine receives the first medium and the second medium.

16 Claims, 11 Drawing Sheets

(51) Int. Cl.
  *F04D 29/44* (2006.01)
  *F04D 29/54* (2006.01)
  *F02C 6/08* (2006.01)
  *B64D 13/06* (2006.01)

(52) U.S. Cl.
  CPC .. *F05D 2260/213* (2013.01); *F05D 2260/606* (2013.01); *Y02T 50/50* (2013.01); *Y02T 50/60* (2013.01)

(56) References Cited

U.S. PATENT DOCUMENTS

| | | | |
|---|---|---|---|
| 3,428,242 | A | 2/1969 | Rannenberg |
| 4,021,215 | A | 5/1977 | Rosenbush |
| 4,261,416 | A | 4/1981 | Hamamoto |
| 4,374,469 | A | 2/1983 | Rannenberg |
| 4,419,926 | A * | 12/1983 | Cronin .................. B64D 13/06 454/74 |
| 4,604,028 | A | 8/1986 | Yeaple et al. |
| 5,299,763 | A * | 4/1994 | Bescoby ............... B64D 13/06 244/118.5 |
| 5,461,882 | A * | 10/1995 | Zywiak .............. B60H 1/00007 62/401 |
| 5,473,899 | A | 12/1995 | Viteri |
| 5,482,229 | A | 1/1996 | Asshauer |
| 5,899,085 | A | 5/1999 | Williams |
| 5,911,388 | A | 6/1999 | Severson et al. |
| 5,967,461 | A | 10/1999 | Farrington |
| 6,199,387 | B1 | 3/2001 | Sauterleute |
| 6,257,003 | B1 | 7/2001 | Hipsky |
| 6,505,474 | B2 | 1/2003 | Sauterleute et al. |
| 6,519,969 | B2 | 2/2003 | Sauterleute |
| 6,526,775 | B1 | 3/2003 | Asfia et al. |
| 6,615,606 | B2 | 9/2003 | Zywiak |
| 6,681,592 | B1 | 1/2004 | Lents et al. |
| 6,776,002 | B1 | 8/2004 | Ho |
| 6,845,630 | B2 | 1/2005 | Bruno |
| 6,848,261 | B2 | 2/2005 | Claeys |
| 7,222,499 | B2 | 5/2007 | Hunt |
| 7,380,749 | B2 | 6/2008 | Fucke et al. |
| 7,607,318 | B2 | 10/2009 | Lui et al. |
| 7,624,592 | B2 | 12/2009 | Lui et al. |
| 7,950,606 | B2 | 5/2011 | Atkey et al. |
| 8,016,228 | B2 | 9/2011 | Fucke et al. |
| 8,042,354 | B1 * | 10/2011 | Dziorny .................. F25B 9/004 62/402 |
| 8,099,973 | B2 | 1/2012 | Sampson et al. |
| 8,302,407 | B2 | 11/2012 | Alecu |
| 8,985,966 | B2 | 3/2015 | Sampson et al. |
| 9,103,568 | B2 | 8/2015 | Beers et al. |
| 9,109,514 | B2 | 8/2015 | Cheong |
| 9,169,024 | B2 | 10/2015 | Voinov |
| 9,211,954 | B2 | 12/2015 | Barkowsky |
| 9,481,468 | B1 | 11/2016 | Schiff |
| 9,555,893 | B2 | 1/2017 | Squier |
| 9,669,936 | B1 | 6/2017 | Fiterman et al. |
| 9,849,990 | B2 | 12/2017 | Bruno |
| 10,059,458 | B2 | 8/2018 | Squier |
| 10,137,993 | B2 | 11/2018 | Bruno et al. |
| 10,144,517 | B2 | 12/2018 | Bruno et al. |
| 10,232,948 | B2 | 3/2019 | Bruno et al. |
| 10,457,401 | B2 | 10/2019 | Feulner |
| 2001/0004837 | A1 | 6/2001 | Sauterleute |
| 2003/0051500 | A1 | 3/2003 | Asfia |
| 2003/0126880 | A1 | 7/2003 | Zywiak |
| 2004/0014418 | A1 | 1/2004 | Farag et al. |
| 2004/0014419 | A1 | 1/2004 | Lents et al. |
| 2004/0055309 | A1 | 3/2004 | Bellows |
| 2004/0195447 | A1 | 10/2004 | Claeys |
| 2006/0059927 | A1 * | 3/2006 | Zywiak .................. B64D 13/06 62/172 |
| 2006/0196216 | A1 | 9/2006 | Bruno et al. |
| 2007/0266695 | A1 | 11/2007 | Lui et al. |
| 2009/0117840 | A1 | 5/2009 | Kresser |
| 2009/0317248 | A1 * | 12/2009 | Tanaka .................. F04D 29/441 415/224.5 |
| 2010/0043794 | A1 * | 2/2010 | Saito .................. B64D 11/0632 128/204.22 |
| 2010/0323601 | A1 | 12/2010 | Cremers et al. |
| 2012/0118528 | A1 | 5/2012 | Al-Ali |
| 2012/0156027 | A1 | 6/2012 | Merritt et al. |
| 2013/0033348 | A1 | 2/2013 | Saito et al. |
| 2013/0118190 | A1 | 5/2013 | Bruno et al. |
| 2013/0133348 | A1 * | 5/2013 | Squier .................... F25B 9/004 62/172 |
| 2013/0136590 | A1 * | 5/2013 | Higashimori ............. F01D 1/06 415/203 |
| 2014/0109603 | A1 | 4/2014 | Fernandes et al. |
| 2014/0238043 | A1 | 8/2014 | Sokhey et al. |
| 2014/0353461 | A1 | 12/2014 | Vignali et al. |
| 2015/0013355 | A1 | 1/2015 | Klimpel et al. |
| 2015/0033730 | A1 | 2/2015 | Beers et al. |
| 2015/0065025 | A1 | 3/2015 | Bruno et al. |
| 2015/0251765 | A1 | 9/2015 | Jonqueres et al. |
| 2015/0251766 | A1 | 9/2015 | Atkey |
| 2015/0275844 | A1 | 10/2015 | Winkler et al. |
| 2015/0307195 | A1 | 10/2015 | Bruno |
| 2015/0329210 | A1 | 11/2015 | Bammann |
| 2016/0083100 | A1 | 3/2016 | Bammann |
| 2016/0214727 | A1 | 7/2016 | Hamel et al. |
| 2017/0021296 | A1 | 1/2017 | Paul et al. |
| 2017/0129614 | A1 | 5/2017 | Bammann et al. |
| 2017/0327235 | A1 | 11/2017 | Feulner |
| 2017/0341759 | A1 | 11/2017 | Bruno et al. |
| 2017/0341760 | A1 | 11/2017 | Hall et al. |
| 2017/0341761 | A1 | 11/2017 | Bruno et al. |
| 2017/0341764 | A1 | 11/2017 | Bruno et al. |
| 2017/0341767 | A1 | 11/2017 | Bruno et al. |
| 2017/0341768 | A1 | 11/2017 | Bruno et al. |
| 2017/0342899 | A1 | 11/2017 | Bruno et al. |
| 2018/0051945 | A1 * | 2/2018 | Hanov .................. B64D 13/06 |
| 2018/0057175 | A1 * | 3/2018 | Klimpel .................... F24F 5/00 |
| 2019/0002111 | A1 | 1/2019 | Bruno et al. |
| 2020/0010202 | A1 | 1/2020 | Bammann et al. |

FOREIGN PATENT DOCUMENTS

| | | |
|---|---|---|
| EP | 1129941 A2 | 9/2001 |
| EP | 1386837 | 2/2004 |
| EP | 2597036 A2 | 5/2013 |
| EP | 2602191 A1 | 6/2013 |
| EP | 2845804 A1 | 3/2015 |
| EP | 2937287 A1 | 10/2015 |
| EP | 2947012 A1 | 11/2015 |
| JP | 5909163 B2 | 4/2016 |
| WO | 03035472 A1 | 5/2003 |
| WO | 2016004021 A1 | 1/2016 |

OTHER PUBLICATIONS

Search Report dated Oct. 5, 2017 in European Patent Application No. 17173077.
Search Report dated Oct. 5, 2017 in European Patent Application No. 17172816.
Search Report dated Oct. 6, 2017 in European Patent Application No. 17172822.
Search Report dated Oct. 9, 2017 in European Patent Application No. 17172889.
Search Report dated Oct. 11, 2017 in European Patent Application No. 17172834.
Search Report dated Oct. 20, 2017 in European Patent Application No. 17172830.
Search Report dated Oct. 20, 2017 in European Patent Application No. 17172757.
Search Report dated Oct. 25, 2017 in European Patent Application No. 17173043.
Search Report dated Nov. 2, 2017 in European Patent Application No. 17172891.
Search Report dated Nov. 10, 2017 in European Patent Application No. 17172821.

(56) References Cited

OTHER PUBLICATIONS

European Office Action for European Application No. 17172757.1 dated Nov. 30, 2018; 6 Pages.
European Office Action; Application No. 171728165; dated Nov. 8, 2019; 5 pages.
European Office Action; Application No. 171728223; dated Nov. 14, 2019; 5 pages.
European Office Action; Application No. 171730773; dated Oct. 21, 2019; 6 pages.
U.S. Non-Final Office Action; U.S. Appl. No. 15/604,481, filed May 24, 2017; dated Feb. 5, 2020; 14 pages.
U.S. Non Final Office Action; U.S. Appl. No. 15/604,397, filed May 24, 2017; dated Mar. 24, 2020, 11 pages.
U.S. Final Office Action; U.S. Appl. No. 15/604,481, filed May 24, 2017; dated May 29, 2020; 17 pages.
U.S. Non-Final Office Action; U.S. Appl. No. 15/604,455, dated Aug. 1, 2019; 9 Pages.
U.S. Non-Final Office Action; U.S. Appl. No. 15/605,697; dated Apr. 11, 2019.
U.S. Non-Final Office Action; U.S. Appl. No. 15/604,534; dated Aug. 21, 2019; 7 Pages.
European Office Action; International Application No. 17173077.3-1007; International Filing Date: May 26, 2017; dated Sep. 9, 2020; 6 pages.

\* cited by examiner

MIXING RAM AND BLEED AIR IN A DUAL ENTRY TURBINE SYSTEM

CROSS-REFERENCE TO RELATED APPLICATION

This application claims benefit of priority to U.S. Provisional Application No. 62/341,845 filed May 26, 2016, the disclosure of which is incorporated herein by reference in its entirety.

BACKGROUND

In general, contemporary air condition systems are supplied a pressure at cruise that is approximately 30 psig to 35 psig. The trend in the aerospace industry today is towards systems with higher efficiency. One approach to improve airplane efficiency is to eliminate the bleed air entirely and use electrical power to compress outside air. A second approach is to use lower engine pressure. The third approach is to use the energy in the bleed air to compress outside air and bring it into the cabin.

BRIEF DESCRIPTION

According to one or more embodiments, a system is provided. The system includes a first medium at a first pressure; a second medium at a second pressure; and a medium conditioning sub-system comprising: a compressor, a first heat exchanger, a second heat exchanger, and a turbine configured to receive the first medium and the second medium.

According to one or more embodiments or any of the above system embodiments, the first medium can comprise fresh air, and the compressor can compress the first medium.

According to one or more embodiments or any of the above system embodiments, the first heat exchanger can be downstream of the compressor.

According to one or more embodiments or any of the above system embodiments, the first heat exchanger can be upstream of the turbine.

According to one or more embodiments or any of the above system embodiments, the second medium can comprise pressured air from a pressurized volume.

According to one or more embodiments or any of the above system embodiments, the second heat exchanger can be configured to receive the second medium.

According to one or more embodiments or any of the above system embodiments, the second heat exchanger can be upstream of the turbine.

According to one or more embodiments or any of the above system embodiments, the turbine can have a first nozzle and a second nozzle, the first nozzle can be configured to accelerate the first medium for entry into an impeller of the turbine, and the second nozzle can be configured to accelerate the second medium for entry into the impeller of the turbine.

According to one or more embodiments or any of the above system embodiments, the second nozzle can comprise variable in area.

According to one or more embodiments or any of the above system embodiments, the turbine can be configured with a first path configured to receive the first medium from the first nozzle, and wherein the turbine can be configured with a second path configured to receive the second medium from the second nozzle.

According to one or more embodiments or any of the above system embodiments, the first medium and the second medium can mix at an exit of the turbine.

According to one or more embodiments or any of the above system embodiments, the system can comprise a pressurized volume; and a third medium.

According to one or more embodiments or any of the above system embodiments, the third medium can source from the pressurized volume.

According to one or more embodiments or any of the above system embodiments, the system can comprise a third heat exchanger configured to transfer heat from the first medium to the third medium.

According to one or more embodiments or any of the above system embodiments, the third heat exchanger can be upstream of the first heat exchanger.

According to one or more embodiments or any of the above system embodiments, the system can comprise a second turbine downstream of the third heat exchanger configured to receive the third medium.

According to one or more embodiments or any of the above system embodiments, the compressor can have a variable area diffuser.

According to one or more embodiments or any of the above system embodiments, the compressor can comprise a mixed flow compressor.

According to one or more embodiments or any of the above system embodiments, the compressor rotor can have high backsweep.

According to one or more embodiments or any of the above system embodiments, the compressor can have a low solidity diffuser.

Additional features and advantages are realized through the techniques of the embodiments herein. Other embodiments are described in detail herein and are considered a part of the claims. For a better understanding of the embodiments with the advantages and the features, refer to the description and to the drawings.

BRIEF DESCRIPTION OF THE DRAWINGS

The subject matter is particularly pointed out and distinctly claimed in the claims at the conclusion of the specification. The forgoing and other features, and advantages thereof are apparent from the following detailed description taken in conjunction with the accompanying drawings in which:

DETAILED DESCRIPTION

A detailed description of one or more embodiments of the disclosed apparatus and method are presented herein by way of exemplification and not limitation with reference to the FIGS.

Embodiments herein provide an environmental control system of an aircraft that mixes mediums from different sources and uses the different energy sources to power the environmental control system and to provide cabin pressurization and cooling at a high fuel burn efficiency. The medium can generally be air, while other examples include gases, liquids, fluidized solids, or slurries.

Figure 1:
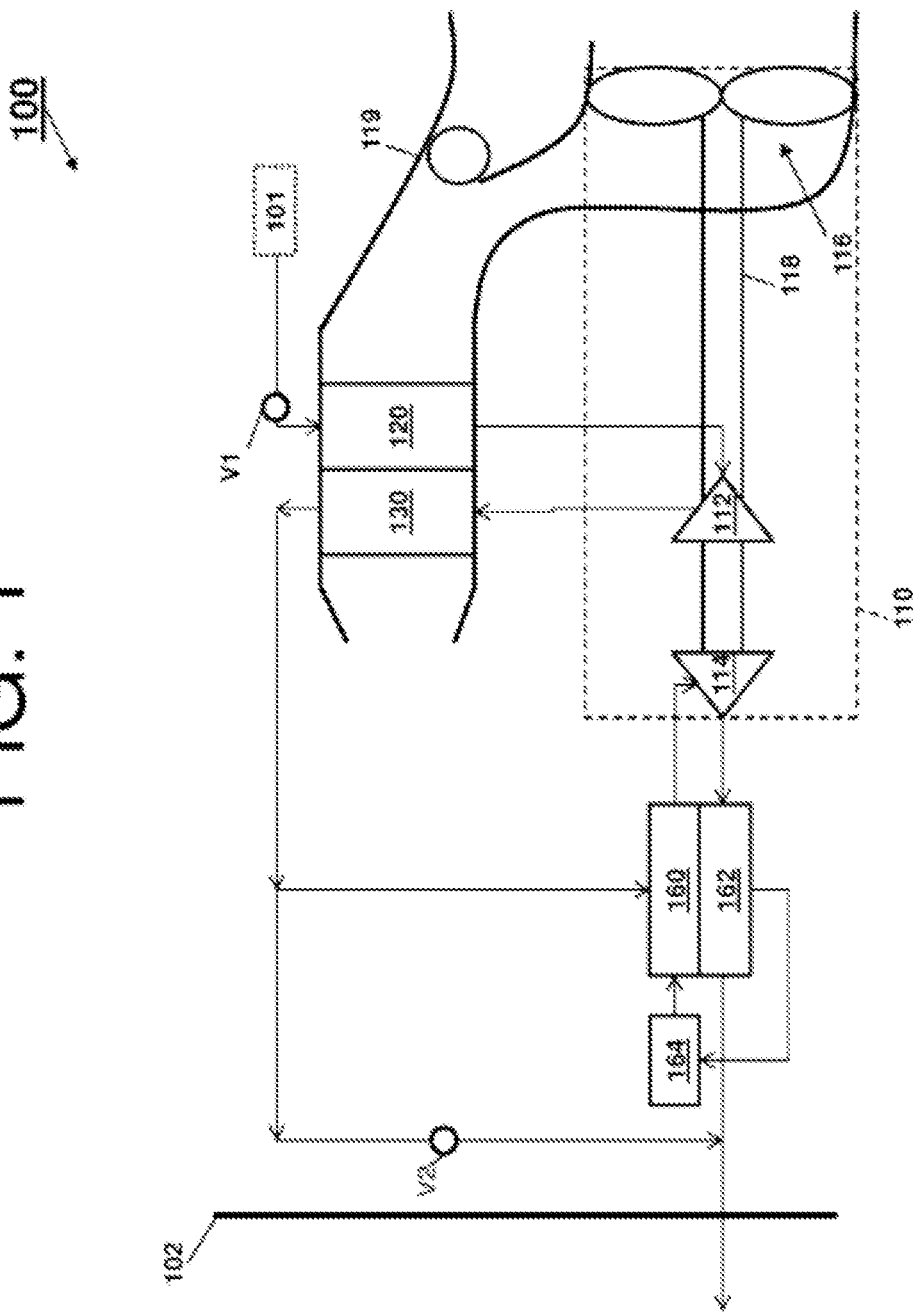
FIG. 1 is a diagram of an schematic of an environmental control system according to an embodiment.

Turning to FIG. 1, a system 100 that receives a medium from an inlet 101 and provides a conditioned form of the medium to a chamber 102 is illustrated. The system 100 comprises a compressing device 110. As shown, the compressing device 110 comprises a compressor 112, a turbine 114, a fan 116, and a shaft 118. The system 100 also comprises a primary heat exchanger 120, a secondary heat exchanger 130, a reheater 160, a condenser 162, and a water extractor 164.

The compressing device 110 is a mechanical device that includes components for performing thermodynamic work on the medium (e.g., extracts work from or works on the medium by raising and/or lowering pressure and by raising and/or lowering temperature). Examples of the compressing device 110 include an air cycle machine, a three-wheel air cycle machine, a four-wheel air cycle machine, etc.

The compressor 112 is a mechanical device that raises the pressure of the medium received from the inlet 101. Examples of compressor types include centrifugal, diagonal or mixed-flow, axial-flow, reciprocating, ionic liquid piston, rotary screw, rotary vane, scroll, diaphragm, air bubble, etc. Further, compressors can be driven by a motor or the medium via the turbine 114.

The turbine 114 is mechanical device that drive the compressor 112 and the fan 116 via the shaft 118. The fan 116 (e.g., a ram air fan) is a mechanical device that can force via push or pull methods air through the shell 119 across the heat exchangers 120 and 130 at a variable cooling to control temperatures. The shell 119 receives and directs a medium (such as ram air) through the system 100.

The heat exchangers 120 and 130 are devices built for efficient heat transfer from one medium to another. Examples of heat exchangers include double pipe, shell and tube, plate, plate and shell, adiabatic wheel, plate fin, pillow plate, and fluid heat exchangers.

The condenser 162 and the reheater 160 are particular types of heat exchanger. The water extractor 164 is a mechanical device that performs a process of taking water from the medium. Together, the condenser 162, the water extractor 164, and/or the reheater 160 can combine to be a high pressure water separator.

The elements of the system 100 are connected via valves, tubes, pipes, and the like. Valves (e.g., flow regulation device or mass flow valve) are devices that regulate, direct, and/or control a flow of a medium by opening, closing, or partially obstructing various passageways within the tubes, pipes, etc. of the system 100. Valves can be operated by actuators, such that flow rates of the medium in any portion of the system 100 can be regulated to a desired value.

As shown in FIG. 1, the medium can flow from an inlet 101 through the system 100 to a chamber 102, as indicated by solid-lined arrows. A valve V1 (e.g., a mass flow control valve) controls the flow of the medium from the inlet 101 to the system 100. Further, a valve V2 controls whether the flow of the medium from the secondary heat exchanger 130 bypasses the condenser 162 in accordance with a mode of the system 100. A combination of components of the system 100 can be referred to as an air conditioning pack or a pack. The pack can begin at a valve V1 and conclude as air exits the condenser 162.

The system 100 will now be described in view of the above aircraft embodiment. In the aircraft embodiment, the medium can be air and the system 100 can be an environmental control system. The air supplied to the environmental control system at the inlet 101 can be said to be "bled" from a turbine engine or an auxiliary power unit. When the air is being provided by the turbine engine or the auxiliary power unit connected to the environmental control system, such as from the inlet 101, the air can be referred to as bleed air. The temperature, humidity, and pressure of the bleed air vary widely depending upon a compressor stage and a revolutions per minute of the turbine engine.

Figure 2:
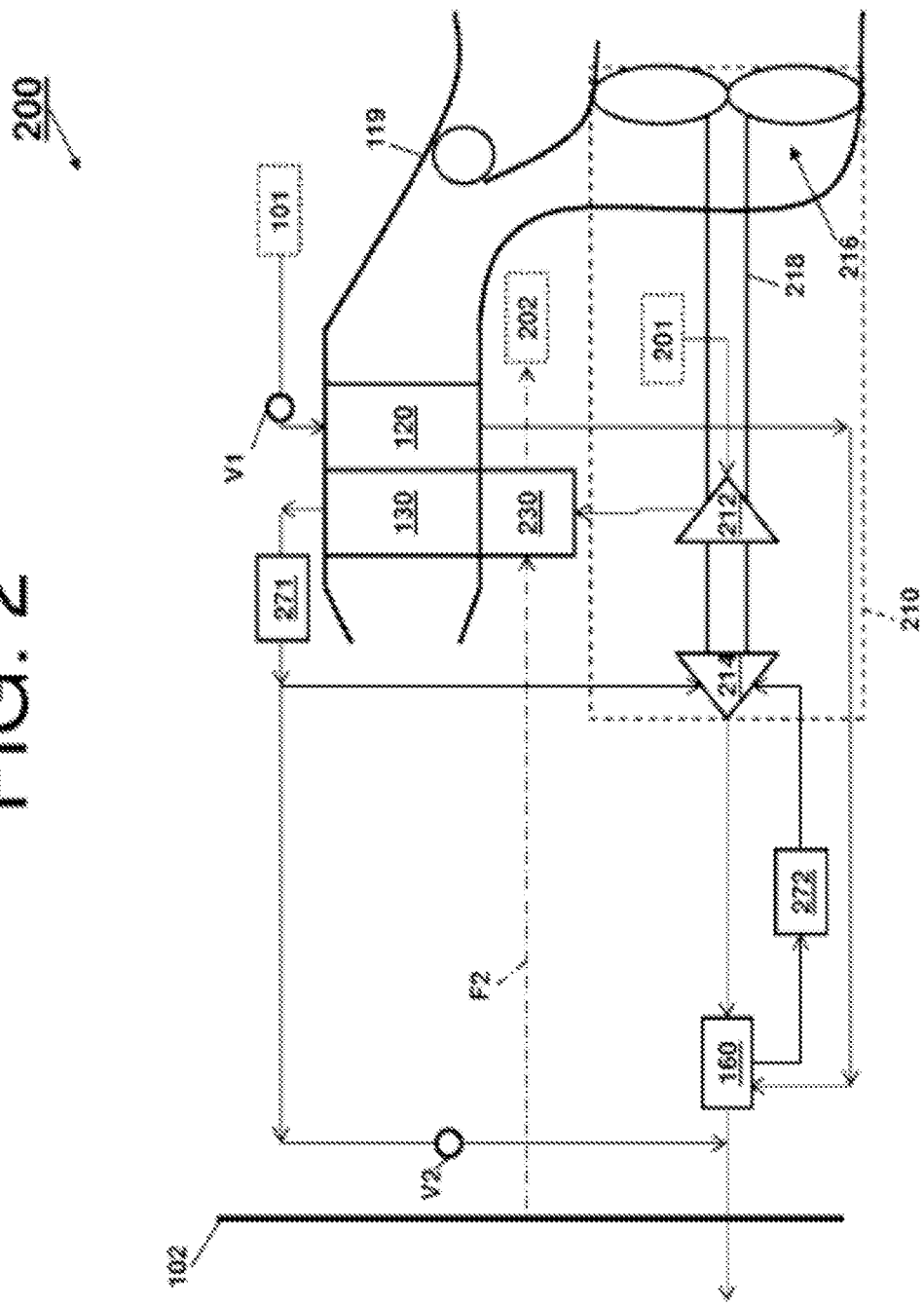
FIG. 2 is operation example of an environmental control system that mixes fresh air with bleed air according to an embodiment.

Turning now to FIG. 2, a schematic of an environmental control system 200 (e.g., an embodiment of system 100), as it could be installed on an aircraft, where in operation the environmental control system 200 mixes fresh air (e.g., a first medium) with bleed air (e.g., a second medium), is depicted according to an embodiment. Components of the system 100 that are similar to the environmental control system 200 have been reused for ease of explanation, by using the same identifiers, and are not re-introduced. Alternative components of the environmental control system 200 include an inlet 201, and outlet 202. Alternative components of the environmental control system 200 include a compressing device 210, which comprises a compressor 212, a turbine 214, a shaft 218, and a fan 316, along with an outflow heat exchanger 230, a water collector 271, and a water collector 272. Note that the environmental control system 200 provides a path for the medium denoted by the dot-dashed line F2 (where the medium can be provided from the chamber 102 into the environmental control system 200). Also note that the turbine 214 can be a dual use and/or a dual entry turbine. A dual use turbine is configured to receive flows of different mediums in the alternative. A duel entry turbine is configured with multiple nozzles that can receive flows of mediums at different entry point, such that multiple flows can be received simultaneously. For example, the turbine 214 can include a plurality of inlet gas flow paths, such as an inner flow path and an outer flow path, to enable mixing of alternative medium flows at the exit of the turbine 214. The inner flow path can be a first diameter, and the outer flow path can be a second diameter. The inner flow path can align with one of the first or second nozzles, and the outer flow path can align with the other of the first or second nozzles.

In view of the above aircraft embodiment, when a medium is being provided from the chamber 102 (e.g., a pressurized volume, cabin of the aircraft, or cabin and flight deck of the aircraft), the medium can be referred as chamber discharge air (also known as pressured air or cabin discharge air). Note that in one or more embodiments, an exhaust from the environmental control system 200 can be sent to an outlet (e.g., releases to ambient air through the shell 119).

Further, when a medium is being provided from the inlet 201, the medium can be referred to as fresh outside air (also known as fresh air or outside air). The fresh outside air can be procured with one or more scooping mechanisms, such as an impact scoop or a flush scoop. Thus, the inlet 201 can be considered a fresh air inlet.

In low altitude operation of the environmental control system 200, high-pressure high-temperature air from either the turbine engine or the auxiliary power unit via inlet 101 through the valve V1 enters the primary heat exchanger 120. The primary heat exchanger 120 cools the pressure high-temperature air to nearly ambient temperature to produce cool high pressure air. This cool high pressure air enters the condenser 162, where it is further cooled by air from the turbine 214 of the compressing device 210. Upon exiting the condenser 162, the cool high pressure air enters the water extractor 272 so that moisture in the air is removed.

The cool high pressure air enters the turbine 214 through a nozzle (e.g., a first nozzle). The cool high pressure air is expanded across the turbine 214 and work extracted from the cool high pressure air. This extracted work drives the compressor 212 used to compress fresh outside air. This extracted work also drives the fan 216, which is used to move air through the primary heat exchanger 120 and the secondary heat exchanger 130 (also known as ram air heat exchangers).

The act of compressing the fresh outside air, heats the fresh outside air. The compressed fresh outside air enters the outflow heat exchanger 230 and is cooled by the chamber discharge air to produce cooled compressed fresh outside air. The cooled compressed fresh outside air then enters the secondary heat exchanger 130 and is further cooled to nearly ambient temperature. The air exiting the secondary heat exchanger 130 then enters the water extractor 271, where any free moisture is removed, to produce cool medium pressure air. This cool medium pressure air then enters the turbine 214 through a nozzle (e.g., a second nozzle). The cool medium pressure air is expanded across the turbine 214 and work extracted from the cool high pressure air. Note that the chamber discharge air exiting from the outflow heat exchanger 230 can then be sent to an outlet 202. The outlet 202 can be a cabin pressure control system that utilized the energy of the chamber discharge air.

The two air flows (e.g., the fresh outside air sourcing from 201 and the bleed air sourcing from inlet 101) are mixed at an exit of the turbine 214 to produce mixed air. The exit of the turbine 214 can be considered a first mixing point of the environmental control system 200. The mixed air leaves the turbine 214 and enters the condenser 162 to cool the bleed air leaving the primary heat exchanger 120. The mixed air is then sent to condition the chamber 102.

This low altitude operation can be consider a low altitude mode. The low altitude mode can be used for ground and low altitude flight conditions, such as ground idle, taxi, take-off, and hold conditions.

In high altitude operation of the environmental control system 200, the fresh outside air can be mixed downstream of the turbine 214 (rather than at the exit of the turbine 214 or at the first mixing point). In this situation, the air exiting the water extractor 271 is the cool medium pressure air. This cool medium pressure air is directed by the valve V2 to downstream of the turbine 214 and/or downstream of the condenser 162. The location at which this cool medium pressure air mixes with the bleed air, which is sourced from the inlet 101 and exiting the condenser 162, can be considered a second mixing point of the environmental control system 200.

This high altitude operation can be considered a high altitude mode. The high altitude mode can be used at high altitude cruise, climb, and descent flight conditions. In the high altitude mode, fresh air aviation requirements for passengers are met by mixing the two air flows (e.g., the fresh outside air sourcing from 201 and the bleed air sourcing from inlet 101). Further, depending on an altitude of the aircraft, an amount of bleed air needed can be reduced. In this way, the environmental control system 200 provides bleed air reduction ranging from 40% to 75% to provide higher efficiencies with respect to engine fuel burn than contemporary airplane air systems.

Figure 3:
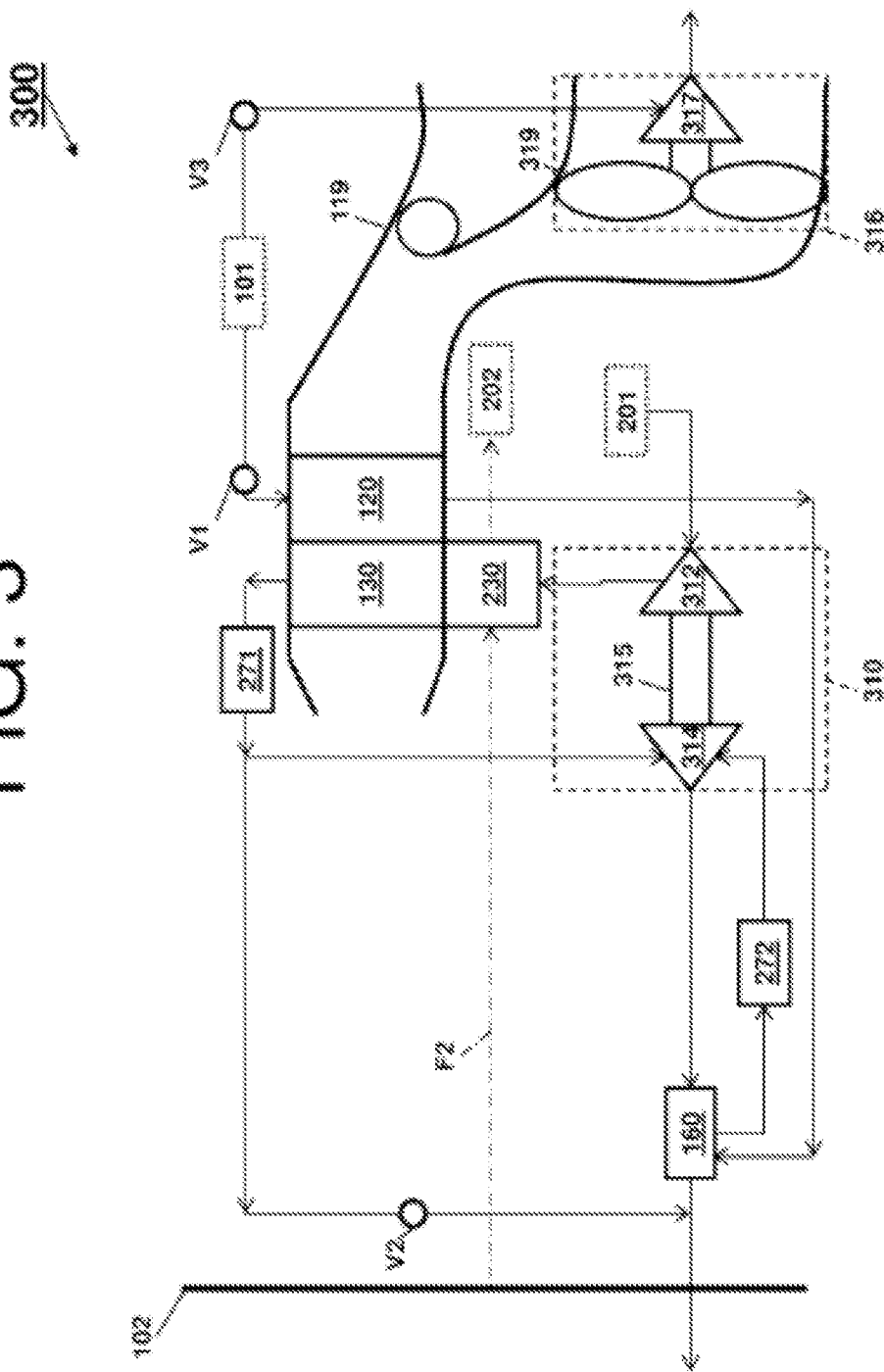
FIG. 3 is operation example of an environmental control system that mixes fresh air with bleed air, where the environmental control system includes a bleed air driven fan, according to an embodiment.
Figure 4:
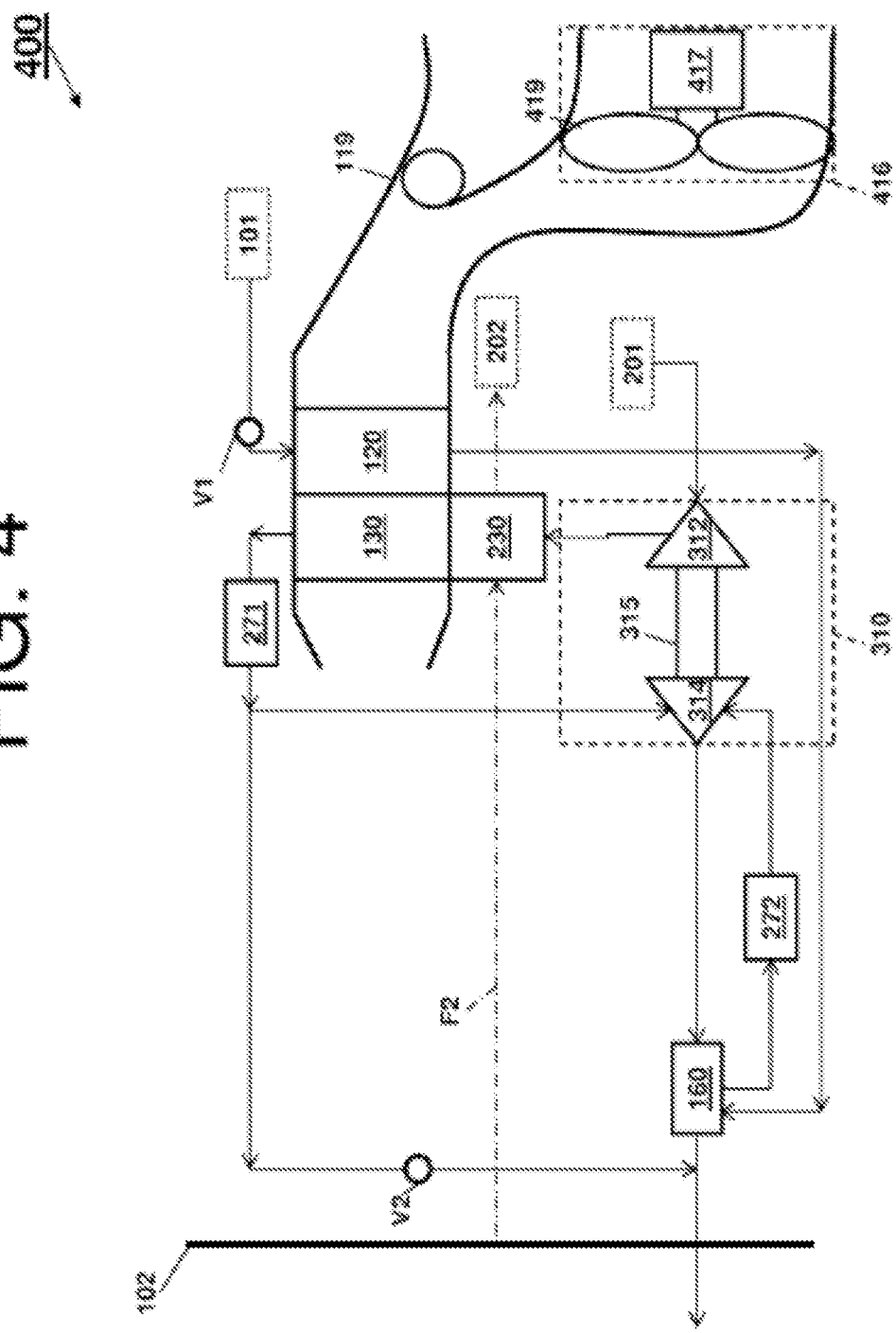
FIG. 4 is operation example of an environmental control system that mixes fresh air with bleed air, where the environmental control system includes an electrically driven fan, air according to an embodiment.

FIGS. 3 and 4 illustrate variations of the environmental control system 200. Turning now to FIG. 3, a schematic of an environmental control system 300 (e.g., an embodiment of the environmental control system 200) is depicted according to an embodiment. Components of the systems 100 and 200 that are similar to the environmental control system 300 have been reused for ease of explanation, by using the same identifiers, and are not re-introduced. Alternative components of the environmental control system 300 include a compressing device 310, which comprises a compressor 312, a turbine 314, and a shaft 315, and a rotating device 316 (e.g., turbine driven fan), which comprises a turbine 317 and a fan 319, along with a secondary path for the medium sourced from the inlet 101 (e.g., a valve V3 can provide the medium from the inlet 101 to an inlet of the turbine 317). Note that the turbine 214 can be a dual use and/or a dual entry turbine.

The environmental control system 300 operates similarly to the environmental control system 200 in that different mixing points are utilized based on the mode of operation. In addition, the environmental control system 300 separates the ram air fan (e.g., fan 216) from the air cycle machine (e.g., the compressing device 210) and provides the ram air fan within the rotating device 316. The turbine 317 of the rotating device 316 is powered by the bleed air sourced from the inlet 101 flowing through the valve V3.

Turning now to FIG. 4, a schematic of an environmental control system 400 (e.g., an embodiment of the environmental control system 200) is depicted according to an embodiment. Components of the systems 100, 200, and 300 that are similar to the environmental control system 400 have been reused for ease of explanation, by using the same identifiers, and are not re-introduced. Alternative components of the environmental control system 400 include a rotating device 416, which comprises a motor 417 and a fan 419.

The environmental control system 400 operates similarly to the environmental control system 200 in that different mixing points are utilized based on the mode of operation. In addition, the environmental control system 400 separates the ram air fan (e.g., fan 216) from the air cycle machine (e.g., the compressing device 210) and provides the ram air fan within the rotating device 416. The motor 417 of the rotating device 416 is powered by electric power.

Figure 5:
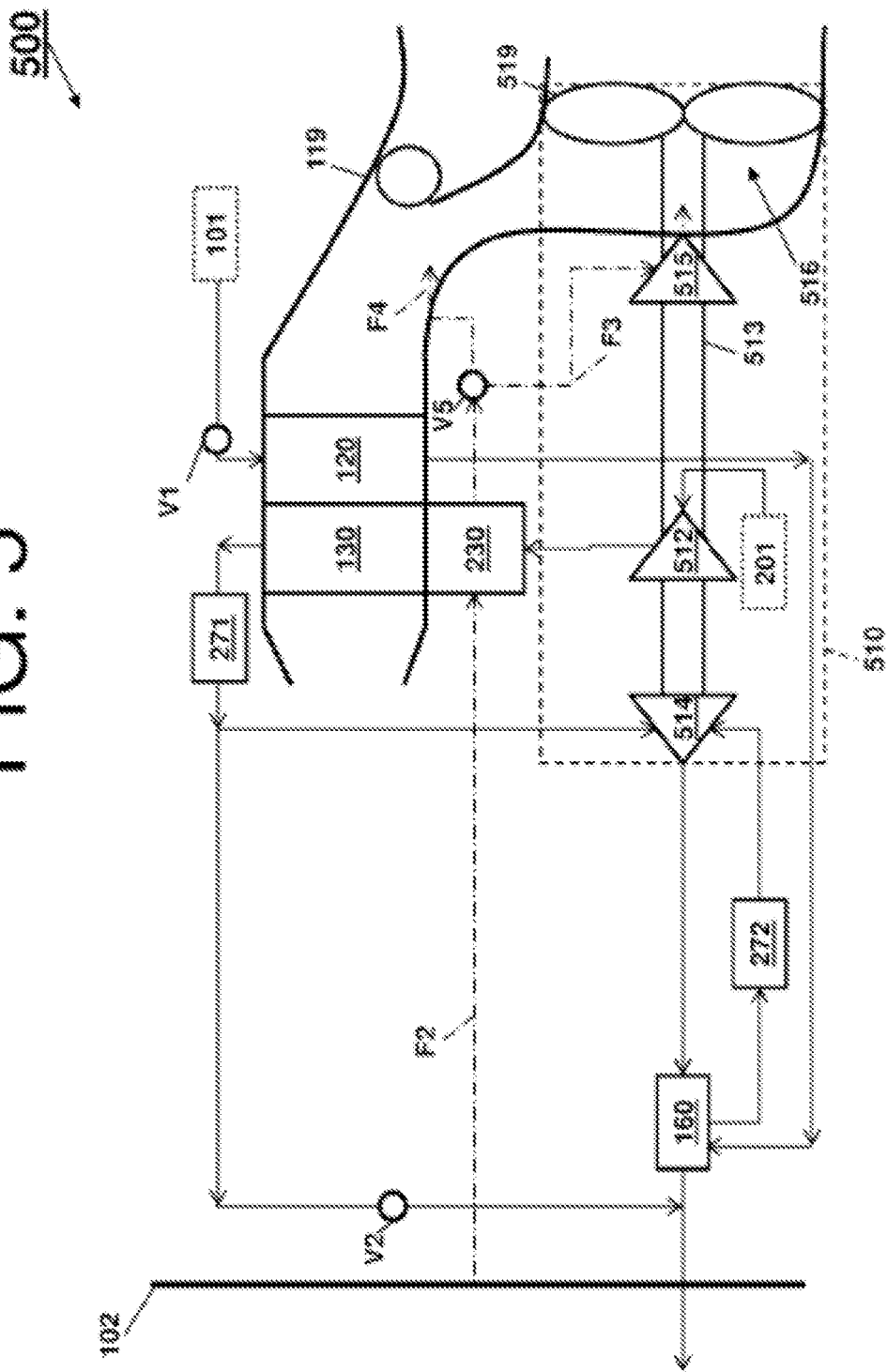
FIG. 5 is operation example of an environmental control system that mixes fresh air with bleed air according to another embodiment.

Turning now to FIG. 5, a schematic of an environmental control system 500 (e.g., an embodiment of system 100), as it could be installed on an aircraft, where in operation the environmental control system 500 mixes fresh air (e.g., a first medium) with bleed air (e.g., a second medium), is depicted according to an embodiment. Components of the systems 100, 200, 300, and 400 that are similar to the environmental control system 500 have been reused for ease of explanation, by using the same identifiers, and are not re-introduced. Alternative components of the environmental control system 500 include a compressing device 510 that comprises a compressor 512, a shaft 513, a turbine 514, and a turbine 515, along with paths for the medium denoted by the dot-dashed lines F3 and F4 (where the medium can be provided from the outflow heat exchanger 230 through a valve V5 to the shell 119 or the turbine 515). Note that the turbine 514 can be a dual use and/or a dual entry turbine.

In low altitude operation of the environmental control system 500, high-pressure high-temperature air from either the turbine engine or the auxiliary power unit via inlet 101 through the valve V1 enters the primary heat exchanger 120. The primary heat exchanger 120 cools the pressure high-temperature air to nearly ambient temperature to produce cool high pressure air. This cool high pressure air enters the condenser 162, where it is further cooled by air from the turbine 514 of the compressing device 510. Upon exiting the condenser 162, the cool high pressure air enters the water extractor 272 so that moisture in the air is removed.

The cool high pressure air enters the turbine 514 through a nozzle (e.g., a first nozzle). The cool high pressure air is expanded across the turbine 514 and work extracted from the cool high pressure air. This extracted work drives the compressor 512 used to compress fresh outside air. This extracted work also drives the fan 516, which is used to move air through the primary heat exchanger 120 and the secondary heat exchanger 130.

The act of compressing the fresh outside air, heats the fresh outside air. The compressed fresh outside air enters the outflow heat exchanger 230 and is cooled by the chamber discharge air to produce cooled compressed fresh outside air. The cooled compressed fresh outside air then enters the secondary heat exchanger 130 and is further cooled to nearly ambient temperature. The air exiting the secondary heat exchanger 130 then enters the water extractor 271, where any free moisture is removed, to produce cool medium pressure air. This cool medium pressure air then enters the turbine 514 through a nozzle (e.g., a second nozzle). The cool medium pressure air is expanded across the turbine 514 and work extracted from the cool high pressure air.

The two air flows (e.g., the fresh outside air sourcing from 201 and the bleed air sourcing from inlet 101) are mixed at an exit of the turbine 514 to produce mixed air. The exit of the turbine 514 can be considered a first mixing point of the environmental control system 200. The mixed air leaves the turbine 514 and enters the condenser 162 to cool the bleed air leaving the primary heat exchanger 120. The mixed air is then sent to condition the chamber 102.

This low altitude operation can be consider a low altitude mode. The low altitude mode can be used for ground and low altitude flight conditions, such as ground idle, taxi, take-off, and hold conditions.

In high altitude operation of the environmental control system 500, the fresh outside air can be mixed downstream of the turbine 514 (rather than at the exit of the turbine 514 or at the first mixing point). In this situation, the air exiting the water extractor 271 is the cool medium pressure air. This cool medium pressure air is directed by the valve V2 to downstream of the turbine 514 and/or downstream of the condenser 162. The location at which this cool medium pressure air mixes with the bleed air, which is sourced from the inlet 101 and exiting the condenser 162, can be considered a second mixing point of the environmental control system 200.

Further, energy in the cabin discharge air exiting from the outflow heat exchanger 230 is used to power the compressor 512 by feeding (e.g., the dot-dashed line F3) the cabin discharge air to the turbine 515. In this way, the additional or second turbine 515 included in the compressing device 510 can be fed hot air from the valve V5 (e.g., an outflow valve). In turn, the compressor 512 receives power from both the bleed air (via turbine 512) and the cabin discharge air (via turbine 515). If the energy is not chosen to be utilized, the cabin discharge air can be sent overboard through the shell 119, as shown by the dot-dashed line F4.

This high altitude operation can be considered a high altitude mode. The high altitude mode can be used at high altitude cruise, climb, and descent flight conditions. In the high altitude mode, fresh air aviation requirements for passengers are met by mixing the two air flows (e.g., the fresh outside air sourcing from 201 and the bleed air sourcing from inlet 101). Further, depending on an altitude of the aircraft, an amount of bleed air needed can be reduced. In this way, the environmental control system 500 provides bleed air reduction ranging from 40% to 75% to provide higher efficiencies with respect to engine fuel burn than contemporary airplane air systems.

Figure 6:
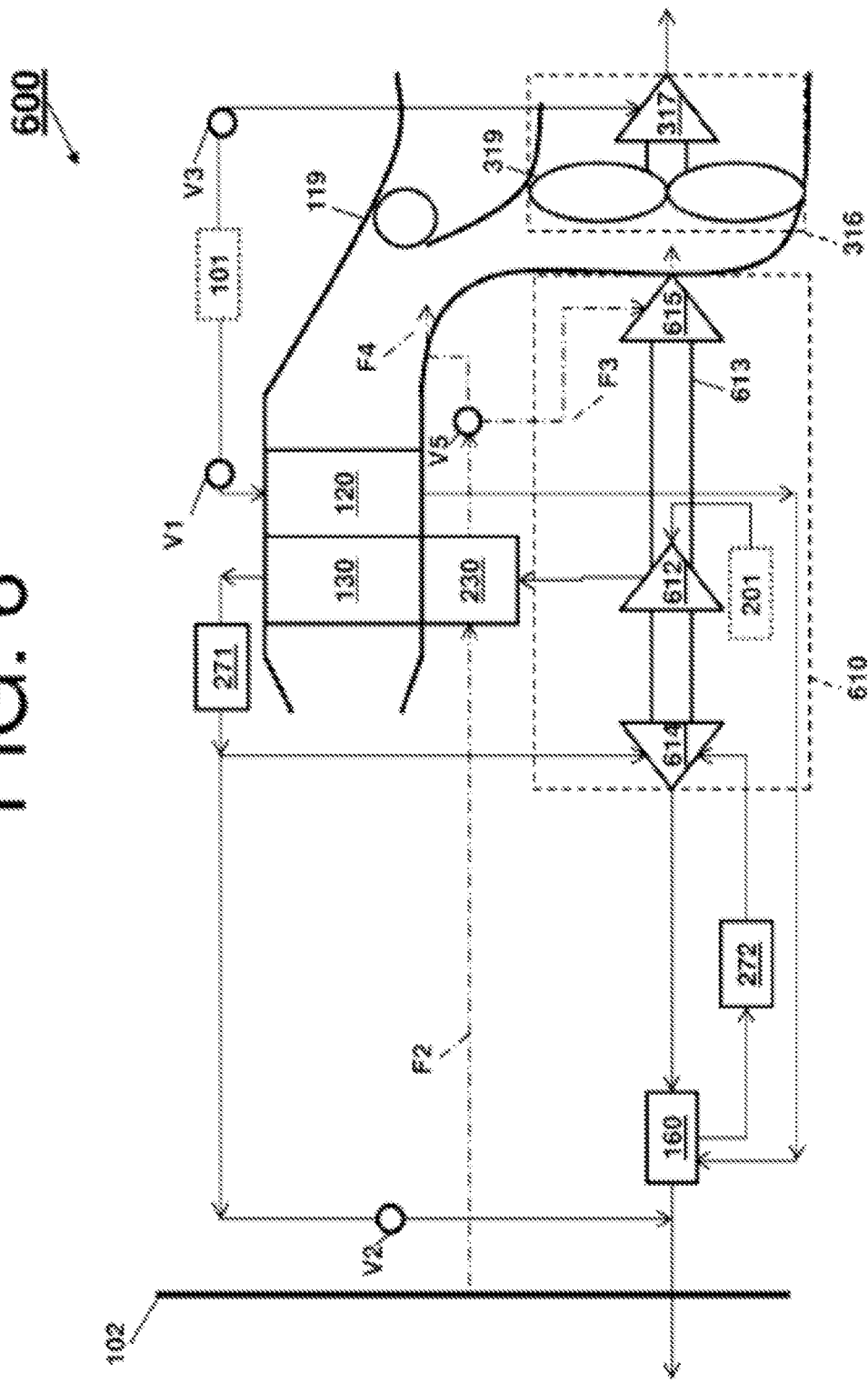
FIG. 6 is operation example of an environmental control system that mixes fresh air with bleed air, where the environmental control system includes a bleed air driven fan, according to another embodiment.
Figure 7:
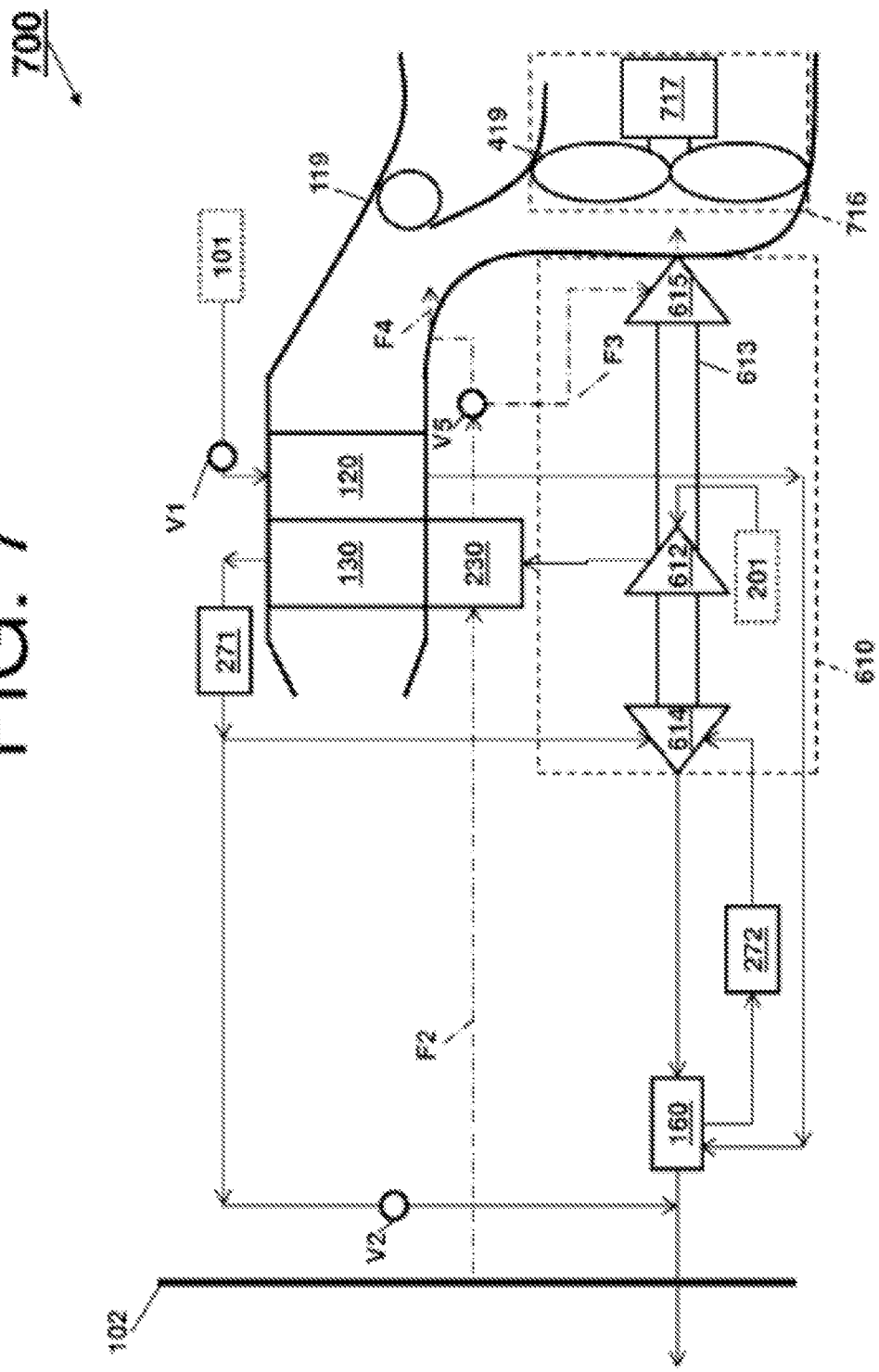
FIG. 7 is operation example of an environmental control system that mixes fresh air with bleed air, where the environmental control system includes an electrically driven fan, air according to another embodiment.

FIGS. 6 and 7 illustrate variations of the environmental control system 200. Turning now to FIG. 6, a schematic of an environmental control system 600 (e.g., an embodiment of the environmental control system 500) is depicted according to an embodiment. Components of the systems 100, 200, 300, 400, and 500 that are similar to the environmental control system 600 have been reused for ease of explanation, by using the same identifiers, and are not re-introduced. Alternative components of the environmental control system 600 include a compressing device 610, which comprises a compressor 612, a shaft 613, a turbine 614, and a turbine 615 (where the turbine 615 can receive the medium from valve V5). Note that the turbine 614 can be a dual use and/or a dual entry turbine.

The environmental control system 600 operates similarly to the environmental control system 500 in that different mixing points are utilized based on the mode of operation. In addition, the environmental control system 600 separates the ram air fan (e.g., fan 516) from the air cycle machine (e.g., the compressing device 510) and provides the ram air fan within the rotating device 316. The turbine 317 of the rotating device 316 is powered by the bleed air sourced from the inlet 101 flowing through the valve V3.

Further, energy in the cabin discharge air exiting from the outflow heat exchanger 230 is used to power the compressor 612 by feeding (e.g., the dot-dashed line F3) the cabin discharge air to the turbine 615. In this way, the additional or second turbine 615 included in the compressing device 610 can be fed hot air from the valve V5 (e.g., an outflow valve). In turn, the compressor 612 receives power from both the bleed air (via turbine 614) and the cabin discharge air (via turbine 615). If the energy is not chosen to be utilized, the cabin discharge air can be sent overboard through the shell 119, as shown by the dot-dashed line F4.

Turning now to FIG. 7, a schematic of an environmental control system 700 (e.g., an embodiment of the environmental control system 500) is depicted according to an embodiment. Components of the systems 100, 200, 300, and 400 that are similar to the environmental control system 700 have been reused for ease of explanation, by using the same identifiers, and are not re-introduced.

The environmental control system 700 operates similarly to the environmental control system 500 in that different mixing points are utilized based on the mode of operation.

In addition, the environmental control system 700 separates the ram air fan (e.g., fan 516) from the air cycle machine (e.g., the compressing device 510) and provides the ram air fan within the rotating device 510. The motor 417 of the rotating device 416 is powered by electric power.

In addition, the above systems 100, 200, 300, 400, 500, 600, and 700 can further utilize an enhanced compressor as the compressor 112 (or compressors 312, 512, and 612) to address compressor range concerns during operations of the system 100. For instance, embodiments herein provide an environmental control system that utilizes bleed pressures to power the environmental control system and to provide cabin pressurization and cooling at a high engine fuel burn efficiency, along with including the enhanced compressor that has high efficiency over a much wider corrected flow and pressure ratio range than the conventional centrifugal compressor. The enhanced compressor can include one or more of a compressor with high rotor backsweep, shroud bleed, and a low solidity diffuser; a variable vaned diffuser, and a mixed flow compressor. The enhanced compressor will now be described with respect to FIGS. 8-11.

Figure 8:
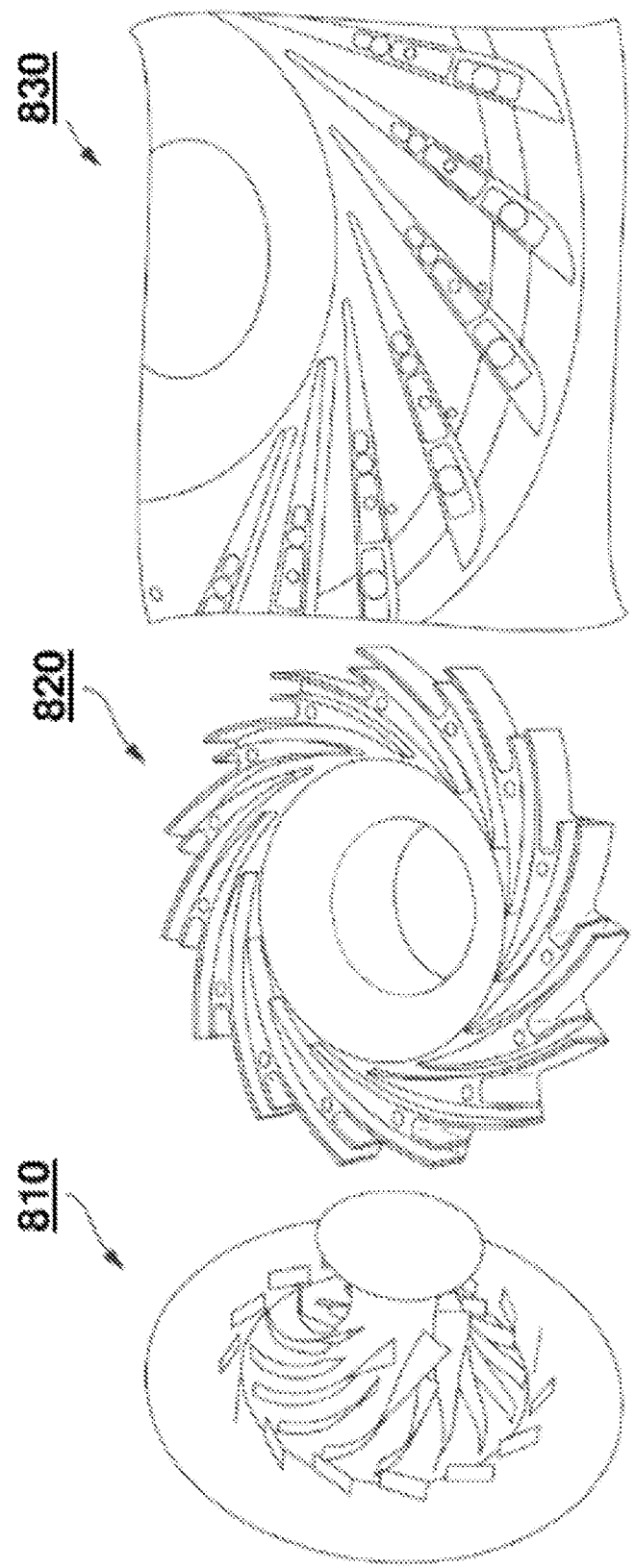
FIG. 8 is a diagram of schematics of diffusers of a compressing device according to an embodiment.

FIG. 8 is a diagram of schematics of diffusers of a compressing device according to an embodiment. FIG. 8 illustrates a plurality of diffusers, a schematic 810 of a low solidity diffuser, a schematic 820 of a curved channel diffusor, and a schematic 830 of a variable vaned diffuser. A diffuser converts the dynamic pressure of the medium flowing downstream of the rotor into static pressure rise by gradually slowing/diffusing a velocity of the medium (e.g., increases static pressure leaving the rotor). The diffuser can be vaneless, vaned or an alternating combination. As different diffuser types impact range and efficiency of the compressor 112 (or compressors 312, 512, and 612), one these diffusers 810, 820, and 830 can be utilized within the compressor 112 (or compressors 312, 512, and 612) (e.g., at position 1106 described below with respect to FIG. 11). The low solidity diffuser has a smaller number of vanes and provides a wide operating range with a lower efficiency. The curved channel diffuser extends arches each of the vanes and provides a narrow operating range with a high efficiency. The variable vaned diffuser comprises a plurality of vanes, each of which is configured to rotate about a pin as an articulating member moves the plurality of vanes, and provides a very high operating range with a high efficiency. Further, a single diffuser that has a combination of two or more of the diffusers 810, 820, and 830 can also be utilized.

Figure 9:
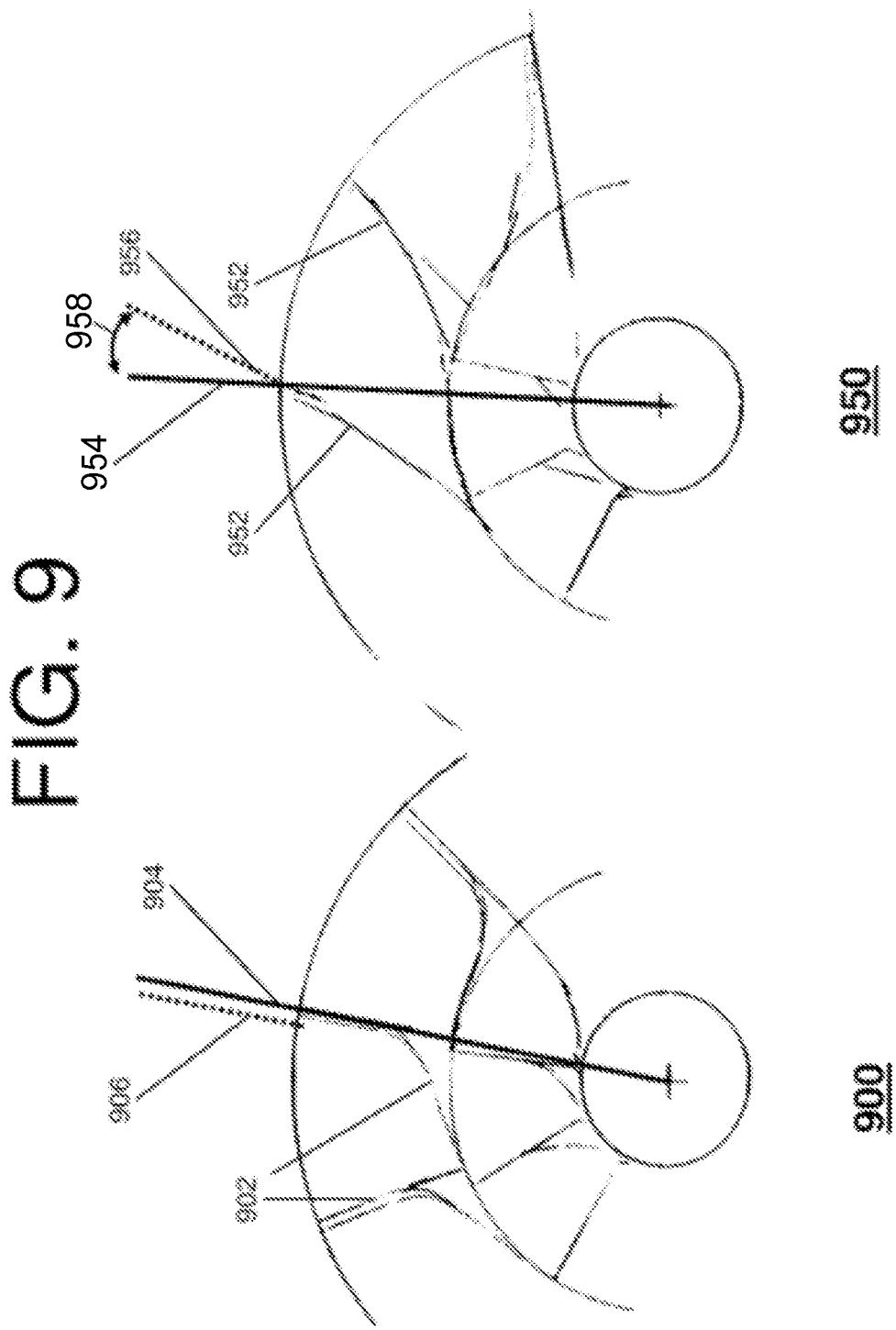
FIG. 9 is a diagram of schematics of compressor rotor backsweep according to an embodiment.
Figure 10:
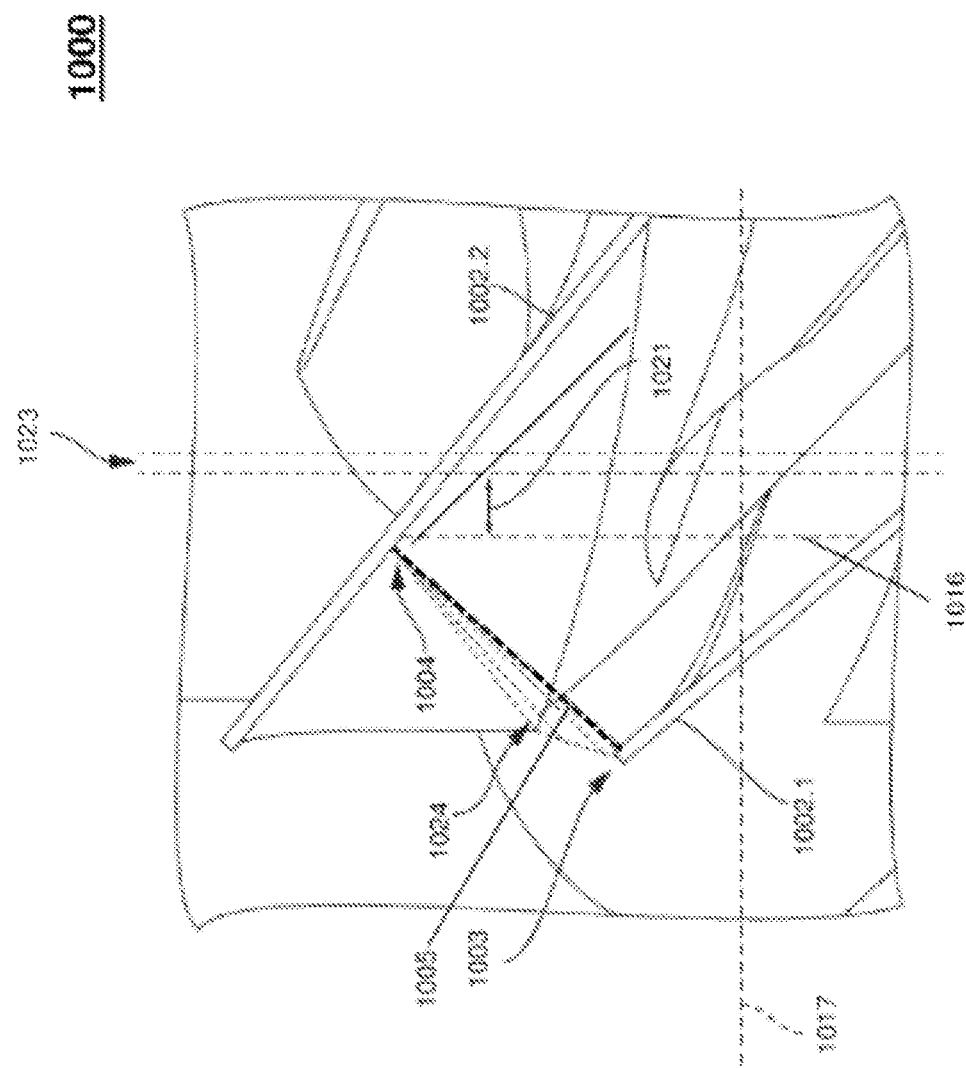
FIG. 10 illustrates a shroud bleed placement diagram according to an embodiment.

Turning now to FIGS. 9-10, the enhanced compressor will now be described with respect to the compressor 112 (or compressors 312, 512, and 612), including a high rotor backsweep with shroud bleed and a low solidity diffuser.

FIG. 9 is a diagram of schematics of a compressor rotor backsweep according to an embodiment. FIG. 9 illustrates a first rotor 900, with a plurality of blades 902, according to an embodiment. As illustrated, a reference line 904 extends radially from a center of the rotor 900. A dotted-line 906 tracks a direction of the rotor blade 902, if the rotor blade 902 were to be extended from a circumferential edge of the rotor 900. As shown, the direction of the rotor blade 902 (e.g., dotted-line 906) is in parallel with the reference line 904, which indicates no rotor backsweep.

FIG. 9 also illustrates a high rotor backsweep 950, with a plurality of blades 952, according to an embodiment. As illustrated, a reference line 954 extends radially from a center of the rotor 950. A dotted-line 956 tracks a direction of the rotor blade 952, if the rotor blade 952 were to be extended from a circumferential edge of the rotor 950. As shown, the direction of the rotor blade 952 (e.g., dotted-line 956) is not in parallel with the reference line 954, which indicates a rotor backsweep. The backsweep can be predetermined during manufacturing of the rotor, and can range from 0° to 90°. Embodiments of the backsweep include, but are not limited to, 0°, 30°, 42°, 45°, and 52°.

FIG. 10 illustrates a shroud bleed placement diagram 1000, which includes a plurality of demarcations and lines overlaying a greyed-out view of a portion of a rotor, according to an embodiment. As shown, rotor blades or impeller blades 1002 (e.g., impeller blades 1002.1 and 1002.2) bound a flow path. From a shroud tip 1003 of the impeller blade 1002.1 (i.e., an impeller blade leading edge) to a shroud suction surface 1004 of the impeller blade 1002.2 a throat 1005 of the flow path is formed. At a location where the throat 1005 contacts the shroud suction surface 1004 of the impeller blade 1002.2, a plane 1016 is formed. The plane 1016 is perpendicular to an axis of rotation 1017 of the rotor itself. The plane 1016 can be utilized to offset 1021 a shroud bleed 1023. In an embodiment, the offset 1021 can be selected from a range, such as a range from 0 to 0.90 inches.

The shroud bleed 1023 can be an opening for allowing a portion of a medium in the flow path to bleed out of or into the flow path instead of exiting the rotor. The shroud bleed 1023 can be a circumferentially located on a housing of the rotor. The shroud bleed 1023 can comprise one or more openings, each of which can be segmented at fixed or varying intervals, lengths, and/or patterns, to accommodate different bleed rates. The shroud bleed 1023 can be holes, slots, cuts, etc. The shroud bleed 1023 can be defined by an area, such as a total open area that is a percentage, e.g., 0 to 50% of a total rotor inlet throat area 1024. The total rotor inlet throat area 1024 is defined by the area 1024 between each pair of impeller blades 1002.

Figure 11:
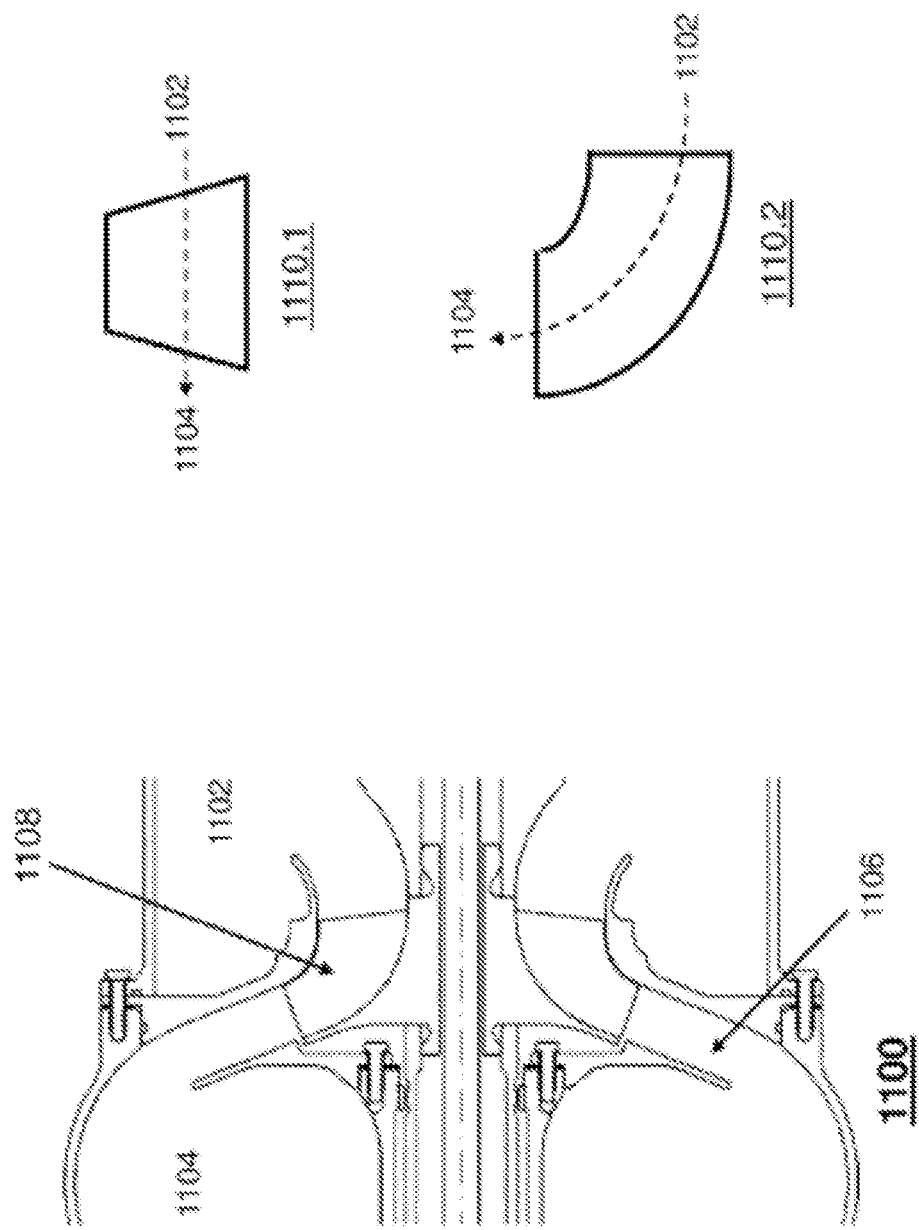
FIG. 11 is a diagram of schematics of a mixed flow channel according to an embodiment.

FIG. 11 is a diagram of schematics of a mixed flow channel according to an embodiment. FIG. 11 illustrates a cross section view 1100 of the compressor 112 (or compressors 312, 512, and 612). As shown in the cross section view 1100, the compressor 112 (or compressors 312, 512, and 612), comprises an inlet 1102 and an outlet 1104, which define a flow path. That is, the flow path between the inlet 1102 and the outlet 1104 is the mixed flow channel. The mixed flow channel can house a diffuser at position 1106 and a rotor at position 1108. A shape of the mixed flow channel can be selected to be between a range of a channel 1110.1 to a channel 1110.2. For instance, the channel 1110.1 is a straight flow path, where a flow of a medium through the channel 1110.1 is parallel to an axis of rotation of the rotor. Further, the channel 1110.2 is a bent flow path, where the flow of the medium through the channel 1110.2 begins at inlet 1102 in parallel with the axis of rotation of the rotor and ends at outlet 1104 perpendicular to the axis of rotation of the rotor.

Aspects of the embodiments are described herein with reference to flowchart illustrations, schematics, and/or block diagrams of methods, apparatus, and/or systems according to embodiments. Further, the descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of embodiments herein. For instance, the steps may be performed in a differing order or steps may be added, deleted or modified. All of these variations are considered a part of the claims.

While the preferred embodiment has been described, it will be understood that those skilled in the art, both now and in the future, may make various improvements and enhancements which fall within the scope of the claims which follow. These claims should be construed to maintain the proper protection.

What is claimed is:

1. A pack of an aircraft environmental control system of, comprising:
   a first medium at a first pressure;
   a second medium at a second pressure;
   a pressurized volume;
   a third medium sourced from the pressurized volume; and
   a medium conditioning sub-system comprising:
     a compressor,
     a ram air circuit including a first heat exchanger and a second heat exchanger,
     a turbine configured to receive the first medium and the second medium; and
     a third heat exchanger arranged upstream from the first heat exchanger relative to a flow of the first medium output from the compressor, wherein heat is transferred from the first medium to the third medium within the third heat exchanger.

2. The environmental control system of claim 1, wherein the first medium comprises fresh air, and
   wherein the compressor compresses the first medium.

3. The environmental control system of claim 2, wherein the first heat exchanger is downstream of the compressor.

4. The environmental control system of claim 3, wherein the first heat exchanger is upstream of the turbine.

5. The environmental control system of claim 1, wherein the second medium comprises pressured air from a pressurized volume.

6. The environmental control system of claim 5, wherein the second heat exchanger is configured to receive the second medium.

7. The environmental control system of claim 6, wherein the second heat exchanger is upstream of the turbine.

8. The environmental control system of claim 1, wherein the turbine has a first nozzle and a second nozzle,
   wherein the first nozzle is configured to accelerate the first medium for entry into an impeller of the turbine, and
   wherein the second nozzle is configured to accelerate the second medium for entry into the impeller of the turbine.

9. The environmental control system of claim 8, wherein the second nozzle comprises vanes variable in area.

10. The environmental control system of claim 9, wherein the turbine is configured with a first path configured to receive the first medium from the first nozzle, and
    wherein the turbine is configured with a second path configured to receive the second medium from the second nozzle.

11. The environmental control system of claim 10, wherein the first medium and the second medium mix at an exit of the turbine.

12. The environmental control system of claim 1, further comprising:
    a second turbine downstream of the third heat exchanger configured to receive the third medium.

13. The environmental control system of claim 1, wherein the compressor has a variable area diffuser.

14. The environmental control system of claim 1, wherein the compressor comprises a mixed flow compressor.

15. The environmental control system of claim 1, wherein the compressor rotor has high backsweep.

16. The environmental control system of claim 1, wherein the compressor has a low solidity diffuser.

* * * * *